C. H. AYARS.
CAN FLUXING MACHINE.
APPLICATION FILED FEB. 8, 1906.

901,867.

Patented Oct. 20, 1908.
2 SHEETS—SHEET 1.

Witnesses
Edwin L. Bradford
G. Ferdinand Vogt.

Inventor
Charles H. Ayars
By
Mann & Co,
Attorney

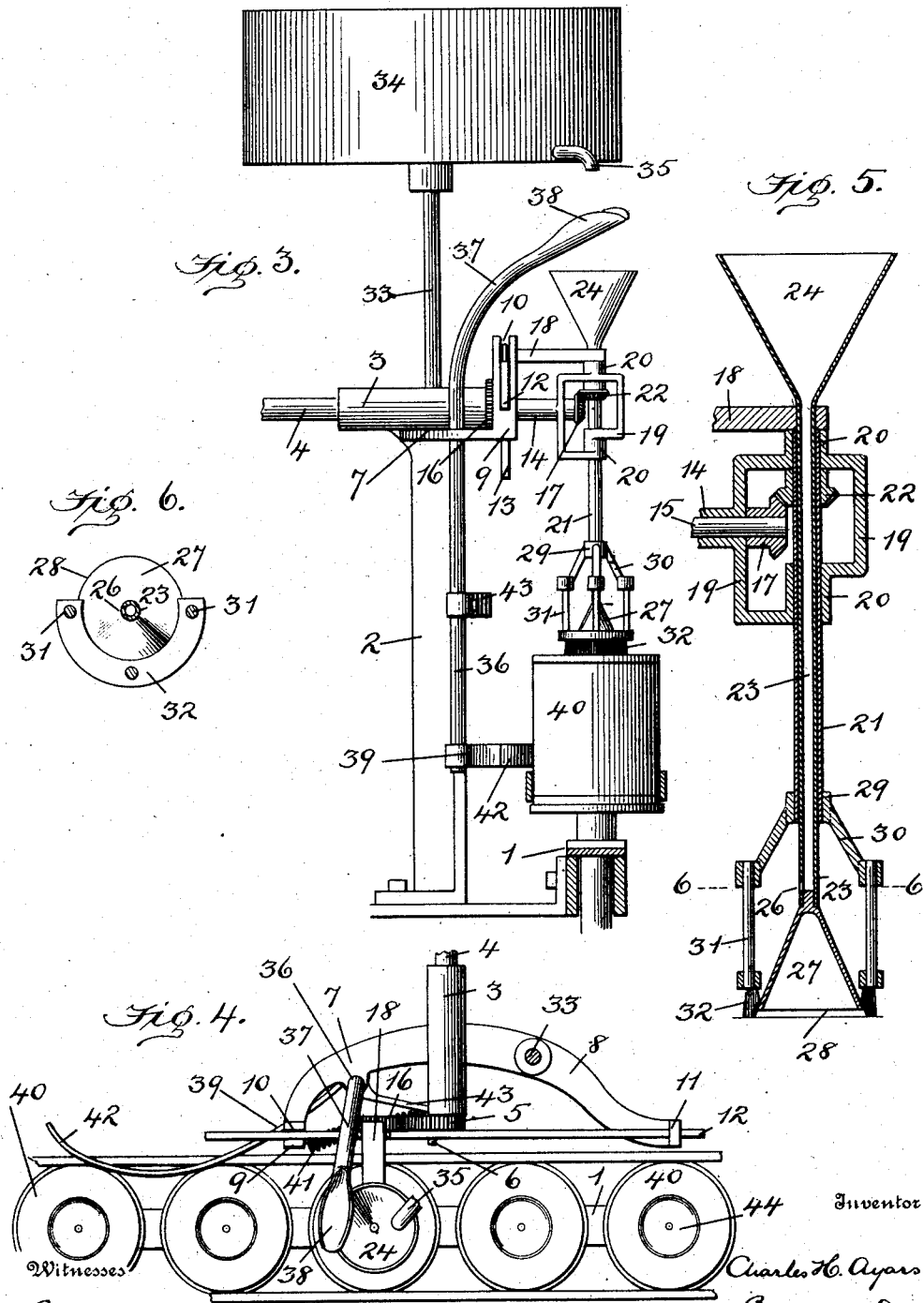

UNITED STATES PATENT OFFICE.

CHARLES H. AYARS, OF SALEM, NEW JERSEY, ASSIGNOR TO AYARS MACHINE COMPANY, OF SALEM, NEW JERSEY, A CORPORATION OF NEW JERSEY.

CAN-FLUXING MACHINE.

No. 901,867.      Specification of Letters Patent.      Patented Oct. 20, 1908.

Application filed February 8, 1906. Serial No. 300,158.

*To all whom it may concern:*

Be it known that I, CHARLES H. AYARS, a citizen of the United States, residing at Salem, in the county of Salem and State of New Jersey, have invented certain new and useful Improvements in Can-Fluxing Machines, of which the following is a specification.

This invention relates to a machine for applying flux to cans and can-caps preparatory to being soldered.

One object of the invention is to provide a single flux device that will have position adjacent to the path through which the cans travel and to successively register with and travel for a short distance with each can during the fluxing operation.

Another object of the invention is to provide a single flux device that will be capable of traveling through a complete vertical circuit so that during its travel through a portion of such circuit it will apply flux to a can, and upon fluxing a can will complete its circuit in time to meet the next approaching can.

Another object of the invention is to provide a flux device that by making a complete vertical circuit will always have position in a vertical plane directly over the moving cans.

Another object of the invention is to provide a construction of a single fluxing device which will travel for a short distance with the can and will feed flux only when a can is in proper position to receive it.

Other objects and advantages will be pointed out in specification and claims forming a part of this application.

Figure 1:
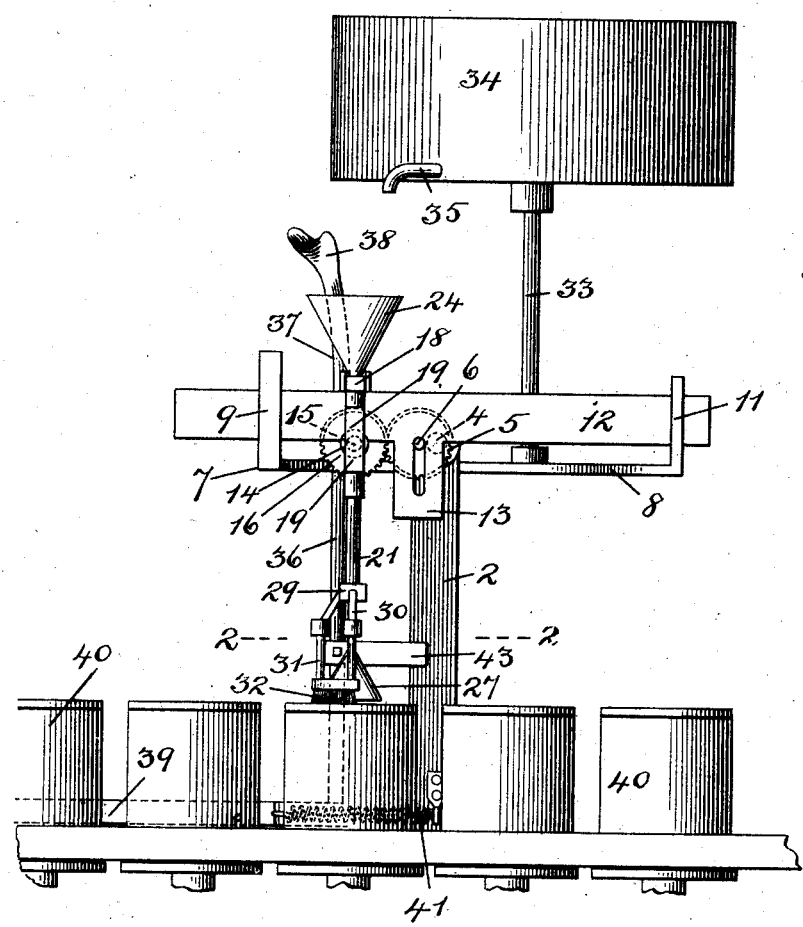
Figure 2:
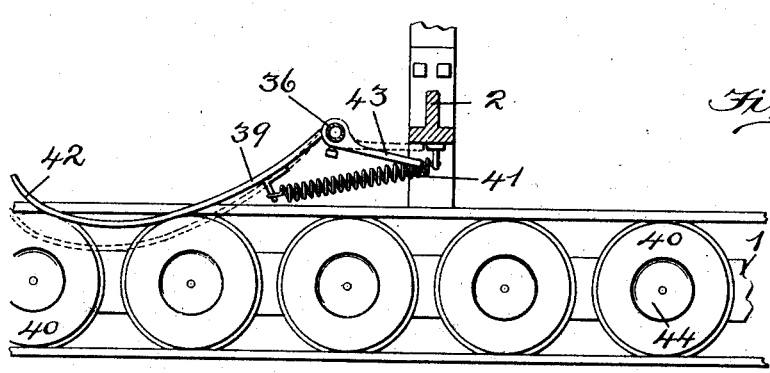

The preferred form of the invention is illustrated in the accompanying drawings, in which, Figure 1 is a side elevation of the machine. Fig. 2, is a horizontal sectional view with the flux-feeding devices removed,—the section being taken on the line 2—2 of Fig. 1. Fig. 3, illustrates an end elevation of the machine transverse to that shown in Fig. 1. Fig. 4, is a plan view of the same with the flux receptacle removed. Fig. 5, is an enlarged vertical sectional detail through the revolving flux-conveying devices, and Fig. 6, is a horizontal section on the line 6—6 of Fig. 5 showing a top view of the flux distributer.

In practical operation I have designed the devices of the present invention to be combined with a machine for soldering the caps on the heads of cans, and as such caps and cans must be provided with a suitable flux to effect a union between them when the soldering is done, the flux machine should be located in close proximity to the capper machine in order that the fluxed cans may be delivered directly to the capper. An example of this arrangement is shown in a companion application for patent on a capping machine which will be executed by me and filed simultaneously with the present application.

Referring to the drawings by numerals, 1, designates a can-carrier or conveyer, which may be of any well-known form. This conveyer, as shown, has a plurality of can-seats on which the cans to be fluxed are placed, and which may be revolved by any well-known means.

At one side of the conveyer, and secured to a suitable fixed position of the frame structure, is a vertical standard, 2, having a bearing, 3, at its upper end through which a horizontal shaft, 4, extends. One end of this horizontal shaft carries a gear, 5, mounted eccentrically and said gear has a crank-pin, 6, projecting laterally from its side.

Two laterally curved bracket arms, 7, and, 8, each project from an opposite side of the said bearing, 3, and the ends of these arms extend in a plane above the can-conveyer. The extreme end, 9, of the said arm, 7, turns upwardly and is provided with a vertical slot, 10, which is open at the top, while the extreme end, 11, of the other arm, 8, also projects vertically and forms a slotted guide which is closed at the top.

A movable bar, 12, has one end projecting through the closed guide, 11, and its other end drops loosely in the open-top slot, 10. Between its ends this bar is provided with a downwardly-projecting arm, 13, which has a vertical slot into which the said crank-pin, 6, of the eccentric-gear projects.

It will be understood that as the eccentric gear is turned the crank-pin, 6, will drive the bar, 12, horizontally through the ends of the bracket arms and in making a complete revolution the crank-pin will impart an elliptical movement to the bar, 12, so as to move it through a continuous vertical circuit.

The movable bar, 12, has a bearing, 14, through which a horizontal shaft, 15, extends. The inner end of this shaft carries a gear, 16, which meshes with the eccentric gear, 5, and the other end carries a bevel pinion, 17. It is to be understood that horizontal shaft, 15, gear, 16, and bevel pinion, 17, are all carried by and travel with the movable bar, 12, and for this reason the said gear, 16, will be maintained in engagement with the eccentric gear, 5.

An arm, 18, is rigidly connected with the upper edge of the bar, 12, and said arm extends horizontally from the bar to a point over the conveyer.

A frame, 19, is rigidly attached at the outer end of the arm, 18, and the bearing, 14, and said frame has two vertical bearings, 20, in which a pendent tubular shaft, 21, turns. A bevel gear, 22, is mounted on this tubular shaft, 21, within the frame, 19, and said gear meshes with the bevel pinion, 17, on the horizontal shaft, 15.

A flux-tube, 23, extends entirely through the tubular shaft, 21, and at its upper end has a funnel, 24, while the lower end carries a cone-shaped flux-distributer, 27, whose diameter is a little less than the diameter of the can-cap. The lower end of the flux-tube is closed but it has an open side port, 26, just above the cone-distributer, 27, so that the flux escaping through the port may flow down on the exterior of the cone-distributer to its lower circular edge, 28.

A collar, 29, is carried on the lower end of the tubular shaft, 21, and is provided with a plurality of laterally-projecting arms, 30. A pendent stem or rod, 31, is carried by each of the arms, 30, and the lower ends of said stems carry a segment-shaped brush, 32, which revolves around the lower edge, 28, of the cone-distributer and receives the flux and applies it to the rim of the can-cap and to the can-top.

It will be understood that the tubular shaft, 21, and segment-brush, 32, are revolved continuously while they are being moved through a complete vertical circuit with the bar, 12.

A standard, 33, is supported on and projects above the curved arm, 8, and at its upper end sustains a liquid-flux receptacle, 34, which has an outlet nozzle, 35, directly above the funnel, 24, of the flux tube.

In the operation of the device it is desirable that the flow of liquid-flux be shut off during the absence of a can beneath the brush, 32, and I have provided a construction for accomplishing this which will now be described.

A flux-escape tube, 36, extends vertically through the bracket-arm, 7, which forms a bearing for it and in which it is free to partly rotate. The upper end of this escape tube curves outwardly as at, 37, and has a flared mouth, 38, which has position between the nozzle, 35, of the flux receptacle and the funnel, 24, of the flux conveying tube, 23. This flux escape tube at its lower end carries an arm, 39, which has position in a horizontal plane where it can project laterally and contact with the circular walls of the cans, 40, as they are advanced by the conveyer. A spiral spring, 41, serves to keep the free-end, 42, of the arm pressed toward the path of the cans, so that as long as cans are present on the conveyer, 1, at the free end of the said arm, 39, the latter will be prevented by the cans from swinging over the conveyer, as seen in Figs. 2 and 4. While the arm and escape-tube are thus held by the cans, the flared mouth, 38, at the upper end of the escape tube will be held away from beneath the nozzle, 35, and the flux dripping from said nozzle will drop into the funnel, 24, and flow down to the brush, 32. When however, one or more cans are absent from the conveyer, the arm, 39, will swing over the conveyer, as indicated by broken lines in Fig. 2; this swinging movement will partially rotate the flux-escape tube, 36, and move the flared mouth, 38, into position directly beneath the drip nozzle, 35, and the flux will thereupon drop into said mouth, instead of into the funnel, 24, and will be conveyed through the escape-tube. In practice a receptacle is provided at the lower end of the escape tube to catch the waste flux dripping therefrom, but this waste-flux receptacle is not shown in the drawing.

In order to limit the swinging movement of the arm, 39, and cause the flared mouth to stop under the nozzle, I provide a stop arm, 43, rigid on the escape tube which when the tube is rotated by the pull of the spring, 41, will contact with the standard, 2, and prevent any further swinging movement.

In operation the cone, 27, seats down upon the can-cap, 44, and as the cone is smaller than the cap the rim-edge of the latter will be left exposed. This cone presses upon the cap and prevents it from turning relative to the can. The liquid flux flows from the cone onto the exposed rim-edge of the cap, and then the brush, 32, applies the flux to both said rim-edge of the cap and to the annular groove in the can-top.

From the foregoing description it will be understood that I employ a single flux-applying device having a movement that will cause it to register and travel with a can while it is fluxing the can-cap and to then by a further movement cause it to meet and travel with the next approaching can to flux it.

It will also be seen that my single flux device is made to travel through a complete vertical circuit in a plane over the center of the cans, and that every can is fluxed by the same brush.

Having thus described my invention what I claim as new and desire to secure by Letters Patent is,—

1. A can-fluxing machine having a device to convey the cans on their ends; a flux-applying device, and one of said devices being revoluble relative to the other; means for moving the flux device in a single vertical plane and parallel with the advancing cans while applying flux to the end thereof and then raise said flux device and return it through the same vertical plane to meet another can.

2. A can-fluxing machine having means to convey the cans; a flux-applying device revolving in a horizontal plane; means for moving the revolving flux device in a direction with a can to apply the flux thereto, and then reverse the movement of the revolving flux device and cause it to return to meet the next can.

3. A can-fluxing machine having a device to support the cans; a flux-applying device; means for revolving the flux-device; means for moving the revolving flux-device through a complete circuit in a vertical plane above the can, and means for rocking the flux device as it moves above the cans.

4. A can-fluxing machine having a movable can carrier; a revolving flux-applying device sustained above the carrier, and means for moving the revolving flux-device through substantially an elliptical circuit to cause it to travel with one can while fluxing it and to then return and meet the next can to be fluxed.

5. A can-fluxing machine having a carrier to move the cans; a bar movable longitudinally above the cans; a flux-applying device carried by said bar; means for revolving the flux device, and means for moving the bar in a lengthwise direction.

6. A can-fluxing machine having a carrier to move the cans; a bar movable longitudinally above the cans; a flux-applying device carried by said bar; means for rocking the bar and simultaneously moving it in a lengthwise direction, and means for revolving the flux-device.

7. A can-fluxing machine having a carrier to move the cans; a reciprocating bar sustained above the cans; a flux-applying device carried by said bar; means for lowering the bar and flux device during their travel in one direction with a can; means for raising the bar and flux device during their travel in a reverse direction to meet the next can, and means for revolving the flux device while it is in contact with a can.

8. A can-fluxing machine having a carrier to move the cans; a bar extending longitudinally above the carrier; a flux-applying device carried by the bar; eccentric gearing for moving the bar longitudinally and for revolving the flux-device, and means for raising and lowering the bar and flux-device while the bar is moving longitudinally.

9. A can-fluxing machine having a carrier to move the cans; a bar sustained above the carrier; a flux-conveying tube sustained by said bar and extending downwardly toward the conveyer, and means for moving the flux-tube and bar through a complete vertical circuit to cause them to travel with one can and to then meet and travel with the next can.

10. A can-fluxing machine having a carrier to move the cans; a bar sustained above the carrier; a tubular shaft sustained by said bar; a flux-conveying tube extending through the shaft; a flux-applying device carried by said shaft; means for revolving said shaft and flux-applying device, and means for causing all of said devices to travel with the can that is being fluxed.

11. A can-fluxing machine having a carrier to move the cans; a bar above the carrier; a flux-conveying tube sustained by said bar; a flux-distributer carried by said tube, and means for raising and lowering said bar, tube and distributer and also moving them with the can that is being fluxed.

12. A can-fluxing machine having a carrier to move the cans; a bar above the carrier; a tubular shaft sustained by said bar; a flux-conveying tube extending through said shaft; a flux-distributer carried by said tube; a flux-applying device carried by said shaft; means for revolving said shaft and flux-applying device, and means for causing the flux-tube, and applying-device to travel with the can that is being fluxed.

13. A can-fluxing machine having a carrier to move the cans; a storage device for the flux; a flux-conveying tube, means for causing the flux-tube to travel with a can, and means movable between the storage device and flux tube to divert the flow of flux during the absence of a can.

14. A can-fluxing machine having a carrier to move the cans in a single row; a flux-applying device maintained in a position over the row of traveling cans; means for revolving the flux-device, and means for reciprocating the revolving flux device in a direction parallel with the movement of the row of cans.

15. A can-fluxing machine having a carrier to move the cans in a single row; a single flux-applying device maintained in a position over the row of traveling cans; means carried by the flux device to contact with the cap of each can, and means for reciprocating the flux device and the cap contacting device in a direction parallel with the traveling cans.

16. A can-fluxing machine having a can-carrier; a cone to press upon the cap of each can; a brush to distribute the flux around the rim-edge of said can-cap; and means for moving said cone and brush through a vertical circuit.

17. A can-fluxing machine having means to move the cans in a row; a flux-device; means for reciprocating the flux-device back and forth over the row of cans; a flux storage receptacle, and means coacting between the flux storage and the flux device and operated by the can to permit the flux to be applied to the flux device.

18. A can-fluxing machine having a carrier to move the cans; a flux-applying device; a flux-conveying tube having a conical flux-distributer at its lower end and means for revolving the flux-applying device around the conical distributer.

19. A can-fluxing machine having a carrier to move the cans; a flux-applying device; a conical flux distributer adjacent the flux-applying device, and means for reciprocating the flux-applying device and flux-distributer in a direction parallel with the traveling cans.

In testimony whereof I affix my signature in presence of two witnesses.

CHARLES H. AYARS.

Witnesses:
JONATHAN W. ACTON,
BENJAMIN E. HARRIS.